United States Patent
Bushman (10) Patent No.: US 9,208,033 B1
(45) Date of Patent: Dec. 8, 2015

(54) CONSOLIDATING DECREMENTAL BACKUPS IN A DECREMENTAL BACKUP CHAIN

(71) Applicant: STORAGECRAFT TECHNOLOGY CORPORATION, Draper, UT (US)

(72) Inventor: Nathan S. Bushman, Draper, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 65 days.

(21) Appl. No.: 14/501,823

(22) Filed: Sep. 30, 2014

(51) Int. Cl.
*G06F 11/14* (2006.01)

(52) U.S. Cl.
CPC ........ *G06F 11/1451* (2013.01); *G06F 2201/84* (2013.01)

(58) Field of Classification Search
CPC .................................................. G06F 11/1451
See application file for complete search history.

(56) References Cited

U.S. PATENT DOCUMENTS

| | | | |
|---|---|---|---|
| 7,694,088 B1* | 4/2010 | Bromley et al. | 711/162 |
| 2002/0049883 A1* | 4/2002 | Schneider et al. | 711/100 |
| 2014/0164330 A1* | 6/2014 | Barnes et al. | 707/646 |

OTHER PUBLICATIONS

DAR, "Command-line Usage Notes," Sep. 28, 2013, http://dar.linux.free.fr/doc/usage_notes.html.*

* cited by examiner

*Primary Examiner* — Grace Park
(74) *Attorney, Agent, or Firm* — Maschoff Brennan (57) ABSTRACT

Consolidating decremental backups in a decremental backup chain. In one example embodiment, a method for consolidating decremental backups in a decremental backup chain includes identifying a decremental backup chain that includes multiple decremental backups of a source storage and a base backup of the source storage, identifying, for consolidation, a sequential set of decremental backups in the multiple decremental backups, identifying a set of oldest blocks from the sequential set of decremental backups for unique block positions of blocks included in the sequential set of decremental backups, and creating a consolidated decremental backup that includes the set of oldest blocks.

15 Claims, 5 Drawing Sheets

CONSOLIDATING DECREMENTAL BACKUPS IN A DECREMENTAL BACKUP CHAIN

FIELD

The embodiments disclosed herein relate to consolidating decremental backups in a decremental backup chain.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and free blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since free blocks are not generally backed up.

Image backup can be relatively fast compared to file backup because reliance on the file system is minimized. An image backup can also be relatively fast compared to a file backup because seeking during image backup may be reduced. In particular, during image backup, blocks are generally read sequentially with relatively limited seeking. In contrast, during file backup, blocks that make up individual files may be scattered in the source storage, resulting in relatively extensive seeking.

Although image backup may be fast compared to file backup, creation of a base backup of source storage can take hours and possibly days to complete, depending on the size of the source storage. Further, repeatedly backing up an entire source storage may be unnecessary where most of the allocated blocks in the source storage do not frequently change.

One alternative to creating multiple base backups is to employ a decremental backup system, also known as reverse incremental backup system. Decremental backup systems initially create a base backup to capture the state of a source storage at an initial point in time, then update the base backup to capture the state of the source storage at a subsequent point in time by modifying only those blocks in the base backup that were modified between the initial and subsequent points in time. Prior to the updating of the base backup, however, any original blocks in the base backup that correspond to the modified blocks are copied to a decremental backup, thus enabling restoration of the source storage at the initial point in time (by restoring the updated base backup and then restoring the decremental backup) or at the subsequent point in time (by simply restoring the updated base backup).

One common problem that is encountered when repeatedly backing up a source storage using a decremental backup system is the proliferation of decremental backups. For example, backups may be taken of a source storage on a weekly basis, resulting in the creation of 52 decremental backups of the source storage each year. While it may initially be beneficial to be able to restore the source storage to its state in a particular week, after several months or years it may be acceptable to only be able to restore the source storage to its state in a particular quarter, in order to reduce the number of backups to $\frac{1}{12}$ of the previous number of backups. However, since each decremental backup depends on another decremental backup or on a base backup, it is not possible to simply delete 11 of every 12 weekly decremental backups in order to reduce a set of weekly backups to a set of quarterly backups.

Another problem encountered when repeatedly backing up a source storage using a decremental backup system is the potential for the inclusion of free blocks in successive backups. Continuing with the above example, a very large digital movie file may be copied onto the source storage, and then backed up by the decremental backup system during one of the weekly backups at the end of a quarter. However, once the shift from needing weekly backups to needing quarterly backups occurs, it may only be necessary to restore to the first week of the quarter, rendering the allocated blocks that correspond to the movie file that are stored in one or more of the weekly backups at the end of the quarter superfluous and needlessly retained.

The proliferation of decremental backups and retaining superfluous blocks in backups may increase the overall size requirements of a destination storage where the backups are stored, increase the bandwidth overhead of transporting the backups, increase the processing time associated with consolidating the backups, and/or increase the processing time associated with restoring the backups.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to consolidating decremental backups in a decremental backup chain. The example methods disclosed herein enable consolidating multiple decremental backups into a single consolidated decremental backup. This consolidation may also involve pruning free blocks out of the consolidated decremental backup. This consolidation and pruning of decremental backups may decrease the number of decremental backups in a decremental backup chain, may decrease the overall size requirements of a destination storage where the decremental backup chain is stored, decrease the bandwidth overhead of transporting the decremental backup chain, and/or decrease the processing time associated with restoring one or more of the backups in the decremental backup chain.

In one example embodiment, a method for consolidating decremental backups in a decremental backup chain includes identifying a decremental backup chain that includes multiple decremental backups of a source storage and a base backup of the source storage, identifying, for consolidation, a sequential set of decremental backups in the multiple decremental backups, identifying a set of oldest blocks from the sequential set of decremental backups for unique block positions of blocks included in the sequential set of decremental backups, and creating a consolidated decremental backup that includes the set of oldest blocks.

In another example embodiment, a method for consolidating decremental backups in a decremental backup chain includes identifying a decremental backup chain that includes multiple decremental backups of a source storage and a base backup of the source storage, identifying, for consolidation, a sequential set of decremental backups in the multiple decremental backups, identifying a set of oldest blocks from the sequential set of decremental backups for unique block positions of blocks included in the sequential set of decremental backups, creating a consolidated decremental backup that includes the oldest blocks, and deleting the sequential set of decremental backups. Each of the multiple decremental backups and the base backup represents a state of the source storage at a point in time.

In yet another example embodiment, a method for consolidating decremental backups in a decremental backup chain includes identifying a decremental backup chain that includes multiple decremental backups of a source storage and a base backup of the source storage, identifying, for consolidation, a sequential set of decremental backups in the multiple decremental backups, identifying a list of unique block positions of blocks included in the sequential set of decremental backups, retrieving file system block allocation maps (FSBAMs) for points in time represented by the oldest decremental backup in the sequential set of decremental backups and represented by any of the other decremental backups in the decremental backup chain that depend on the oldest decremental backup in the sequential set of decremental backups, pruning, out of the list of unique block positions, unique block positions that are indicated as being free in all of the FSBAMs, searching forward in the sequential set of decremental backups, from the oldest decremental backup in the sequential set of decremental backups, for the first block for each of the unique block positions in the pruned list of unique block positions, creating a consolidated decremental backup that includes the first blocks, and deleting the sequential set of decremental backups.

It is to be understood that both the foregoing general description and the following detailed description are exemplary and explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

The term "storage" as used herein refers to computer-readable media, or some logical portion thereof such as a volume, capable of storing data in blocks. The term "block" as used herein refers to a fixed-length discrete sequence of bits. In some example embodiments, the size of each block may be configured to match the standard sector size of a file system of a storage on which the block is stored. For example, the size of each block may be 512 bytes (4096 bits) where 512 bytes is the size of a standard sector. The term "allocated block" as used herein refers to a block in a storage that is currently tracked as storing data by a file system of the storage. The term "free block" as used herein refers to a block in a storage that is not currently employed nor tracked as storing data by a file system of the storage. The term "backup" when used herein as a noun refers to a copy or copies of one or more blocks from a storage. The term "base backup" as used herein refers to a base backup of a storage that includes at least a copy of each unique allocated block of the storage at a point in time such that the base backup can be restored on its own to recreate the state of the storage at the point in time, without being dependent on any other backup. A "base backup" may also include nonunique allocated blocks and free blocks of the storage at the point in time. The term "decremental backup" as used herein refers to an at least partial backup of a storage that includes at least a copy of each unique allocated block from a base backup of the storage that corresponds to a block that was modified in the source storage between a previous point in time and a subsequent point in time, such that the decremental backup, along with all subsequent decremental backups of the storage, including a base backup of the storage, can be restored together to recreate the exact state of the storage at the previous point in time. A "decremental backup" may also include nonunique allocated blocks and free blocks from a base backup of the storage that correspond to blocks that were modified in the source storage between the point in time and the subsequent point in time. The term "modified block" as used herein refers to a block that was modified either because the block was previously allocated and changed or because the block was modified by being newly allocated. A "base backup" and/or a "decremental backup" may exclude certain undesired allocated blocks such as blocks of data belonging to files whose contents are not necessary for restoration purposes, such as virtual memory pagination files and machine hibernation state files.

Figure 1:
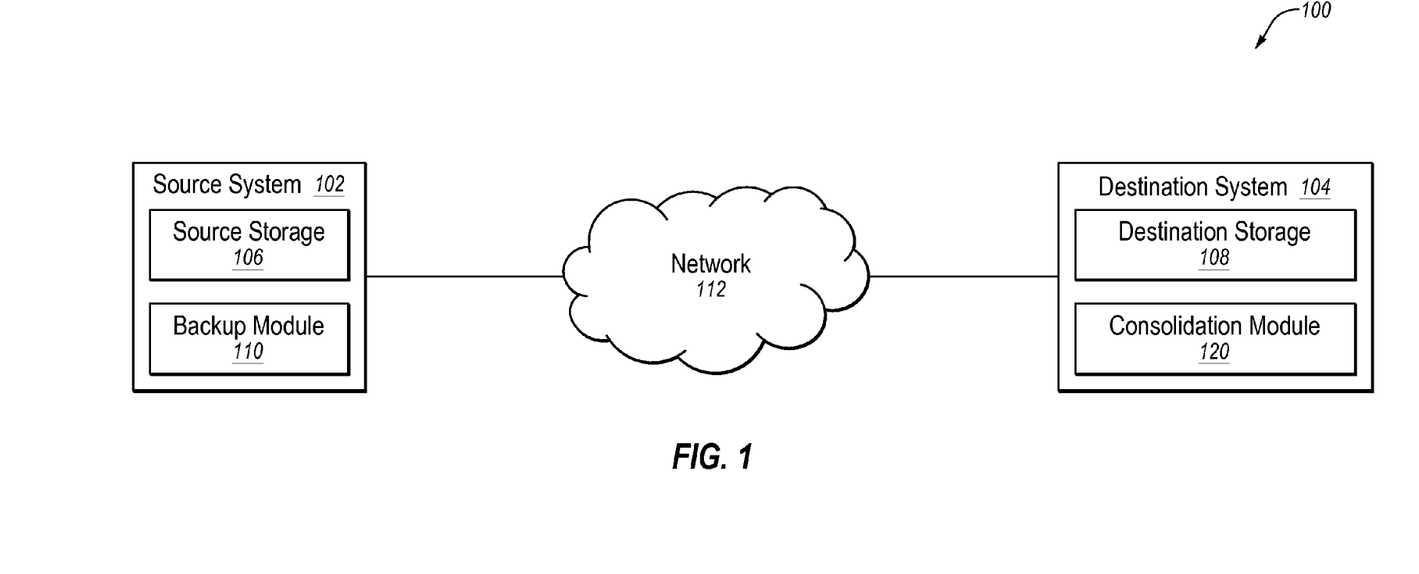
FIG. 1 is a schematic block diagram illustrating an example image backup system.

FIG. 1 is a schematic block diagram illustrating an example image backup system 100. As disclosed in FIG. 1, the example image backup system 100 includes a source system 102 and a destination system 104. The source system 102 includes a source storage 106 and the destination system 104 includes a destination storage 108. The source system 102 also includes a backup module 110. The destination system 104 further includes a consolidation module 120. The systems 102 and 104 are able to communicate with one another over a network 112.

The source system 102 and the destination system 104 may be any computing device capable of supporting a storage, including a virtual storage such as a virtual volume, and communicating with other systems including, for example, a file server, a web server, a personal computer, a desktop computer, a laptop computer, a handheld device, a multiprocessor system, a microprocessor-based or programmable consumer electronic device, a smartphone, a digital camera, a hard disk drive, a flash memory drive, a virtual machine, or some combination thereof. The network 112 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

In one example embodiment, the source system 102 may be a desktop computer, the destination system 104 may be a file server, and the network 112 may include the internet. In this example embodiment, the desktop computer may be configured to periodically back up its storage over the internet as part of a backup job by creating a base backup and multiple decremental backups in a decremental backup chain and storing these backups in the storage of the file server. The desktop computer may also be configured to track modifications to its storage between backups in order to easily and quickly identify, during the creation of a decremental backup, only those blocks that were modified. The file server may be further configured to periodically consolidate decremental backups, thereby decreasing the number of backups in the decremental backup chain and the size of the decremental backup chain, as discussed below. The file server may also be configured to restore one or more of the backups to the storage of the desktop computer over the internet if the desktop computer experiences corruption or a user simply desires to restore the storage of the desktop computer to an earlier point in time.

The image backups stored in the destination storage 108 may be created by the backup module 110. For example, the backup module 110 may be configured to execute computer instructions to perform image backup operations of creating a base backup and multiple decremental backups of the source storage 106. It is noted that these image backups may initially be created on the source system 102 and then copied to the destination system 104.

The consolidation module 120 may be configured to consolidate decremental backups in a decremental backup chain stored in the destination storage 108. For example, after the backup module 110 has created a base backup and multiple decremental backups of the source storage 106 in a decremental backup chain, and stored the base backup and multiple decremental backups in the destination storage 108, the consolidation module 120 may periodically consolidate decremental backups in the decremental backup chain, thereby decreasing the number of backups in the decremental backup chain and the size of the decremental backup chain.

Although only a single storage is disclosed in each of the systems 102 and 104 in FIG. 1, it is understood that any of the systems 102 and 104 may instead include two or more storages. Further, although the systems 102 and 104 are disclosed in FIG. 1 as communicating over the network 112, it is understood that the systems 102 and 104 may instead communicate directly with each other. For example, in some embodiments the systems 102 and 104 may be combined into a single system. Also, although the storages 106 and 108 are disclosed as separate storages, it is understood that the storages 106 and 108 may be combined into a single storage. For example, in some embodiments a first volume of the source storage 106 may function as a source storage during the creation of a backup that is stored in a second volume of the source storage 106. Subsequently, the backup stored in the second volume may be restored to the first volume, which may enable the first volume of the source storage 106 to be restored to a state of an earlier point in time. In another example, the source system 102 may have a separate storage (not shown) to which a backup of the source storage 106 is restored. In both of these examples, the source system 102 functions as both a source system and a restore system. Further, although the backup module 110 and the consolidation module 120 are the only modules disclosed in the example image backup system 100 of FIG. 1, it is understood that the functionality of the backup module 110 and the consolidation module 120 may be replaced or augmented by one or more similar modules residing on either of the systems 102 and 104 or another system.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2A:
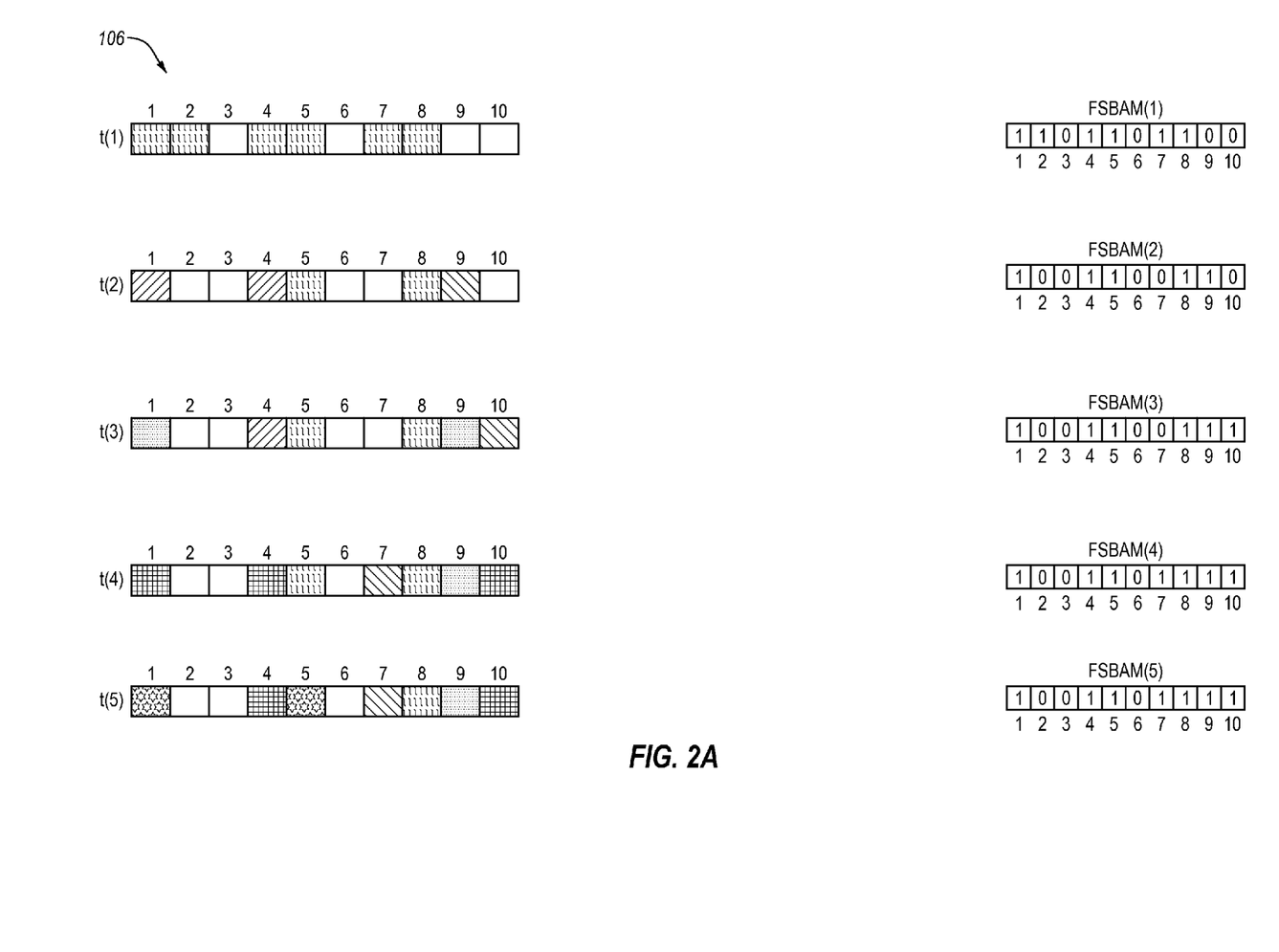
FIGS. 2A and 2B are schematic block diagrams illustrating an example source storage and an example decremental backup chain.
Figure 2B:
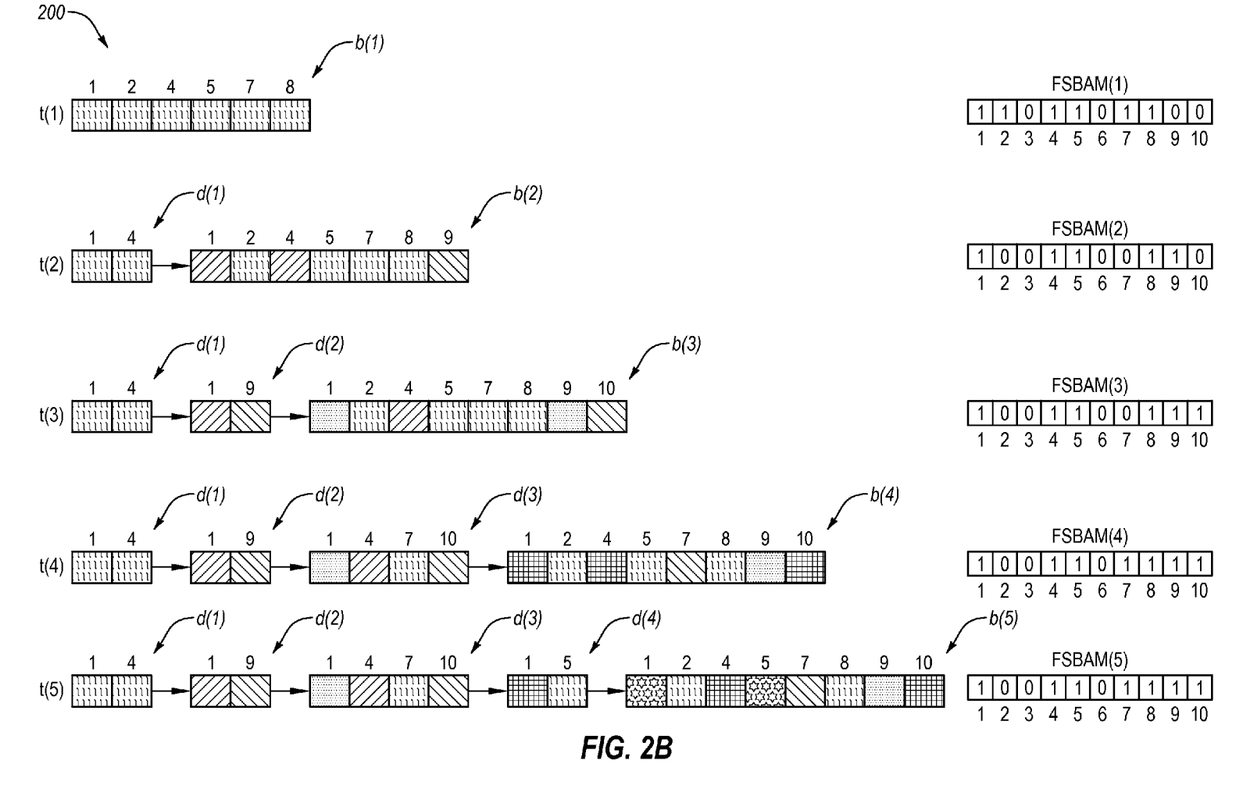

FIGS. 2A and 2B are schematic block diagrams illustrating the example source storage 106 and an example decremental backup chain 200. In particular, FIG. 2A discloses the states of the source storage 106 at times t(1), t(2), t(3), t(4), and t(5) and FIG. 2A discloses the example decremental backup chain 200 representing the states of the source storage 106 at times t(1), t(2), t(3), t(4), and t(5). As disclosed in FIGS. 2A, 2B, and 3, blocks that are allocated are illustrated with a hatch pattern, and blocks that are free are illustrated as blank.

FIGS. 2A and 2B also illustrate file system block allocation map (FSBAMs) that represent the allocated and free blocks of the source storage 106 at times t(1), t(2), t(3), t(4), and t(5), namely, FSBAM(1), FSBAM(2), FSBAM(3), FSBAM(4), and FSBAM(5), respectively. As disclosed in FIGS. 2A and 2B, allocated blocks in the FSBAMs are represented with a 1 bit and free blocks in the FSBAMs are represented with a 0 bit. For example, the FSBAM(2) has allocated blocks in positions 1, 4, 5, 8, and 9 and the FSBAM(3) has allocated blocks in positions 1, 4, 5, 8, 9, and 10. Although the FSBAMs are disclosed in FIGS. 2A and 2B as including a 1 bit or 0 bit for each block position, it is understood that the FSBAMs may instead be implemented using other data structures that do not necessarily include a bit for each block position, such as a run-length encoded list of free and/or allocated blocks. The FSBAMs may be employed during a consolidation of decremental backup in the decremental backup chain 200, as discussed in greater detail below.

As disclosed in FIGS. 2A and 2B, the example decremental backup chain 200 includes base backups b(1), b(2), b(3), b(4), and b(5), which represent the states of the source storage 106 at times t(1), t(2), t(3), t(4), and t(5), respectively. In addition, the decremental backup chain 200 includes decremental backups d(1), d(2), d(3), and d(4), which represent the states of the source storage 106 at times t(1), t(2), t(3), and t(4), respectively. In one example embodiment, the backup module 110 creates the base backups b(1), b(2), b(3), b(4), and b(5) and the decremental backups d(1), d(2), d(3), and d(4) of the source storage 106 and stores them in the destination storage 108.

The base backup b(1) may be created to preserve the state of the source storage 106 at time t(1). The creation of the base backup b(1) may include the backup module 110 copying all allocated blocks of the source storage 106 as allocated at time t(1) and storing the allocated blocks in the destination storage 108. In this example, only blocks in positions 1, 2, 4, 5, 7, and 8 are allocated in the source storage 106 at time t(1), as blocks at positions 3, 6, 9, and 10 are not allocated at time t(1). The state of the source storage 106 at time t(1) may be captured using snapshot technology in order to capture the data stored in the source storage 106 at time t(1) without interrupting other processes, thus avoiding downtime of the source storage 106. The base backup b(1) may be very large depending on the size of the source storage 106 and the number of allocated blocks at time t(1). As a result, the base backup b(1) may take a relatively long time to create and consume a relatively large amount of space in the destination storage 108. It is noted that the base backup b(1) may have a randomly-writeable format in order to allow the base backup b(1) to have new blocks inserted into the base backup at various positions. The base backup b(1) may be associated with the FSBAM(1), which represents the allocated and free blocks of the source storage 106 at time t(1).

Next, the decremental backup d(1) may be created to preserve the state of the source storage 106 at time t(1) while the base backup b(1) is updated to capture the state of the source storage 106 at time t(2), resulting in the updated base backup b(2). This may be accomplished by the backup module 110 identifying allocated blocks in the source storage 106 that changed between time t(1) and time t(2), as well as newly-allocated blocks that were allocated in the source storage 106 between time t(1) and time t(2). In this example, the blocks at positions 1 and 4 in the source storage 106 were changed, and the block at position 9 in the source storage 106 was newly allocated. The backup module 110 may then identify original blocks in the base backup b(1) with the same positions as the changed allocated and newly-allocated blocks in the source storage 106, namely, the blocks at positions 1 and 4 in the base backup b(1), and copy these original blocks at positions 1 and 4 from the base backup b(1) into the decremental backup d(1). The changed allocated blocks and newly-allocated blocks from the source storage 106, namely, the changed allocated blocks from positions 1 and 4 and newly-allocated block from position 9 of the source storage 106, are then copied to the base backup b(1), resulting in the updated base backup b(2). As a result, the decremental backup d(1) represents the state of the source storage 106 at time t(1) and the updated base backup b(2) represents the state of the source storage 106 at time t(2). The base backup b(2) may be associated with the FSBAM(2), which represents the allocated and free blocks of the source storage 106 at time t(2).

Next, the decremental backup d(2) may be created to preserve the state of the source storage 106 at time t(2) while the updated base backup b(2) is again updated to capture the state of the source storage 106 at time t(3), resulting in the updated base backup b(3). This may be accomplished by the backup module 110 identifying allocated blocks in the source storage 106 that changed between time t(2) and time t(3), as well as newly-allocated blocks that were allocated in the source storage 106 between time t(2) and time t(3). In this example, the blocks at positions 1 and 9 in the source storage 106 were changed, and the block at position 10 in the source storage 106 was newly allocated. The backup module 110 may then identify original blocks in the base backup b(2) with the same positions as the changed allocated and newly-allocated blocks in the source storage 106, namely, the blocks at positions 1 and 9, and copy these original blocks at positions 1 and 9 from the updated base backup b(2) into the decremental backup d(2). The changed allocated blocks and newly-allocated blocks from the source storage 106, namely, the changed allocated blocks from positions 1 and 9 and the newly-allocated block from position 10 of the source storage 106, are then copied to the updated base backup b(2), resulting in the updated base backup b(3). As a result, the decremental backup d(1) represents the state of the source storage 106 at time t(1), the decremental backup d(2) represents the state of the source storage 106 at time t(2), and the updated base backup b(3) represents the state of the source storage 106 at time t(3). The base backup b(3) may be associated with the FSBAM(3), which represents the allocated and free blocks of the source storage 106 at time t(3).

By comparing the FSBAM(3) to the FSBAM(2), it can be determined that between time t(2) and time t(3) the previously-free block at position 10 in the source storage 106 became an allocated block. Since the block at position 10 was free in the source storage 106 at time t(2), which is represented by the decremental backup d(2), the example methods of consolidating decremental backups disclosed herein may be employed to prune the block at position 10 when the decremental backups d(3) and d(4) are consolidated into the decremental backup d(2), as discussed in greater detail below.

Next, the decremental backup d(3) may be created to preserve the state of the source storage 106 at time t(3) while the updated base backup b(3) is again updated to capture the state of the source storage 106 at time t(4), resulting in the updated base backup b(4). This may be accomplished by the backup module 110 identifying allocated blocks in the source storage 106 that changed between time t(3) and time t(4), as well as newly-allocated blocks that were allocated in the source storage 106 between time t(3) and time t(4). In this example, the blocks at positions 1, 4, and 10 in the source storage 106 were changed, and the block at position 7 in the source storage 106 was newly allocated. The backup module 110 may then identify original blocks in the base backup b(3) with the same positions as the changed allocated and newly-allocated blocks in the source storage 106, namely, the blocks at positions 1, 4, 7, and 10, and copy these original blocks at positions 1, 4, 7, and 10 from the updated base backup b(3) into the decremental backup d(3). The changed allocated blocks and newly-allocated blocks from the source storage 106, namely, the changed allocated blocks from positions 1, 4, and 10 and the newly-allocated block from position 7 of the source storage 106, are then copied to the updated base backup b(3), resulting in the updated base backup b(4). As a result, the decremental backup d(1) represents the state of the source storage 106 at time t(1), the decremental backup d(2) represents the state of the source storage 106 at time t(2), the decremental backup d(3) represents the state of the source storage 106 at time t(3), and the updated base backup b(4) represents the state of the source storage 106 at time t(4). The base backup b(4) may be associated with the FSBAM(4), which represents the allocated and free blocks of the source storage 106 at time t(4).

Next, the decremental backup d(4) may be created to preserve the state of the source storage 106 at time t(4) while the updated base backup b(4) is again updated to capture the state of the source storage 106 at time t(5), resulting in the updated base backup b(5). This may be accomplished by the backup module 110 identifying allocated blocks in the source storage 106 that changed between time t(4) and time t(5), as well as newly-allocated blocks that were allocated in the source storage 106 between time t(4) and time t(5). In this example, the blocks at positions 1 and 5 in the source storage 106 were changed, and no blocks in the source storage 106 were newly allocated. The backup module 110 may then identify original blocks in the base backup b(4) with the same positions as the changed allocated blocks in the source storage 106, namely, the blocks at positions 1 and 5, and copy these original blocks at positions 1 and 5 from the updated base backup b(4) into the decremental backup d(4). The changed allocated blocks from the source storage 106, namely, the changed allocated blocks from positions 1 and 5 of the source storage 106, are then copied to the updated base backup b(4), resulting in the updated base backup b(5). As a result, the decremental backup d(1) represents the state of the source storage 106 at time t(1), the decremental backup d(2) represents the state of the source storage 106 at time t(2), the decremental backup d(3) represents the state of the source storage 106 at time t(3), the decremental backup d(4) represents the state of the source storage 106 at time t(4), and the updated base backup b(5) represents the state of the source storage 106 at time t(5). The base backup b(5) may be associated with the FSBAM(5), which represents the allocated and free blocks of the source storage 106 at time t(5).

Therefore, decremental backups may be created on an ongoing basis. The frequency of creating new decremental backups may be altered as desired in order to adjust the amount of data that will be lost should the source storage 106 experience corruption of its stored data or become unavailable at any given point in time. The data from the source storage 106 can be restored to the state at the point in time of a particular decremental backup by applying the image backups to a restore storage from newest to oldest, namely, first applying the base backup and then applying each successive decremental backup up to the particular decremental backup. For example, the data from the source storage 106 can be restored to the state at time t(1), after time t(2), by applying the base backup b(2) and then applying the decremental backup d(1). Similarly, the data from the source storage 106 can be restored to the state at time t(1), after time t(5), by applying the base backup b(5), then applying the decremental backups d(4), d(3), and d(2), and finally applying the decremental backup d(1). Alternatively, the data from the source storage 106 can be restored to the state at the point in time of a particular decremental backup by applying the image backups to the restore storage concurrently, namely, concurrently applying the base backup and each successive decremental backup up to the particular decremental backup. For example, the data from the source storage 106 may be restored to the state at time t(1), after time t(5), by accessing the base backup b(5) and the decremental backups d(4), d(3), d(2), and d(1) concurrently, and retrieving from each backup the correct block content corresponding to time t(1). Advantageously, the most recent backup state of the source storage 106 can be restored at any stage of the decremental backup chain 200 by simply applying the base backup of the decremental backup chain 200.

Since the FSBAM(1)-FSBAM(5) represent states of the source storage 106 at times t(1)-t(5), respectively, each of FSBAM(1)-FSBAM(5) may be associated with all backups in the decremental backup chain 200 that correspond to the point in time represented by the FSBAM. For example, since the FSBAM(1) and the backups b(1) and d(1) all represent states of the source storage 106 at time t(1), the FSBAM(1) may be associated with the backups b(1) and d(1), as illustrated in FIG. 2B. In some embodiments, an FSBAM associated with a decremental backup in a decremental backup chain may be reconstructed by searching forward in the decremental backup chain, beginning with the decremental backup, for the first block for each of one or more block positions that make up the FSBAM in order to reconstruct the FSBAM. Similarly, an FSBAM associated with a base backup in a decremental backup chain may be accessed by accessing one or more blocks in the base backup that make up the FSBAM. In other embodiments, a complete copy of the FSBAM may be associated with a decremental backup or a base backup in a decremental backup chain.

Figure 3:
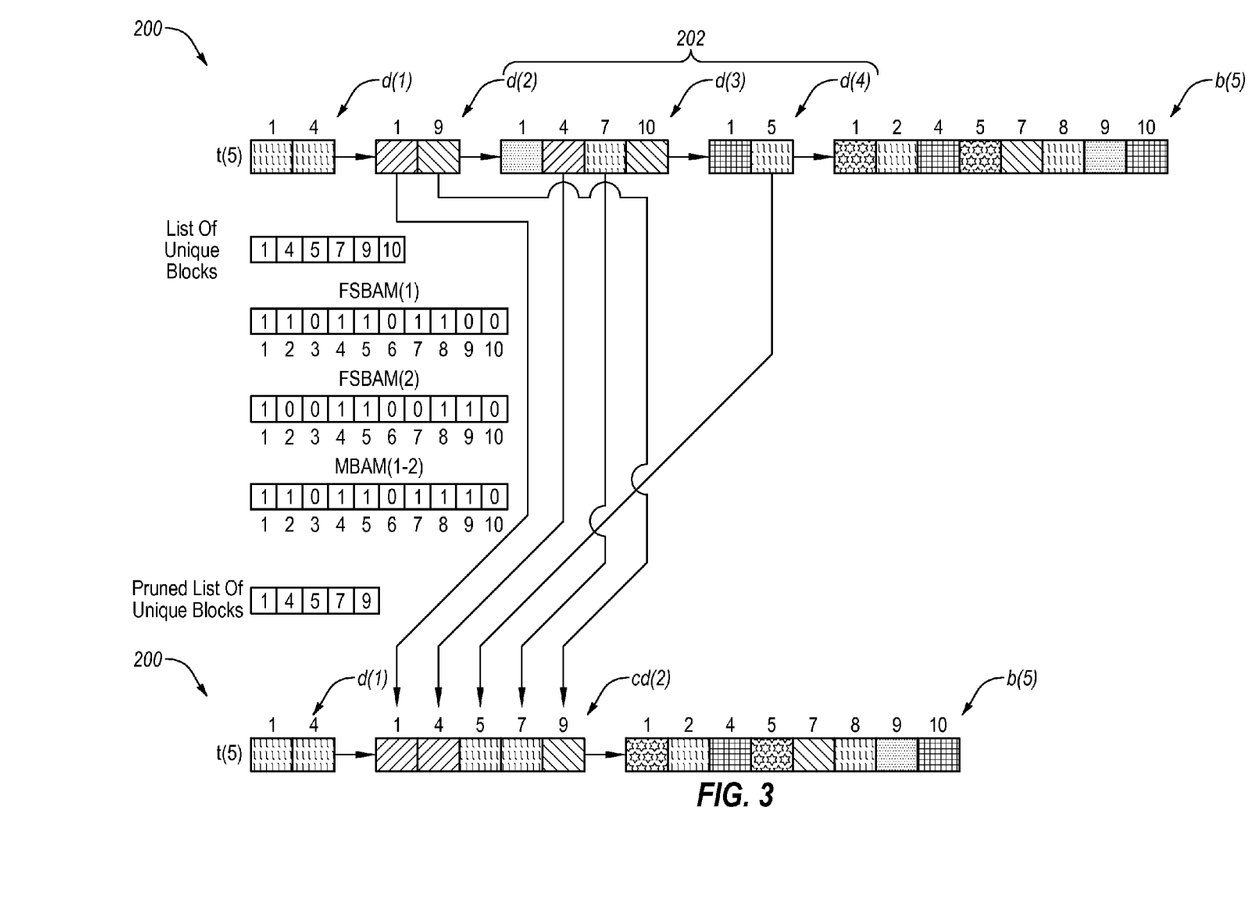
FIG. 3 is a schematic block diagram illustrating an example consolidation of a set of decremental backups in a decremental backup chain.

FIG. 3 is a schematic block diagram illustrating an example consolidation of a set 202 of decremental backups in the decremental backup chain 200. As disclosed in FIG. 3, the set 202 of decremental backups includes sequential decremental backups d(2), d(3), and d(4). The term "sequential decremental backups" or "sequential set of decremental backups" as used herein refers to decremental backups in a decremental backup chain that are next to each other in the decremental backup chain such that all but the newest decremental backup in the sequential decremental backups directly depend on each other from oldest to newest. The example consolidation of the set 202 of decremental backups illustrated in FIG. 3 may be performed in order to decrease the number of backups in the decremental backup chain 200 and in order to decrease the size of the decremental backup chain 200, as discussed below.

As disclosed in FIG. 3, the consolidating of the set 202 of decremental backups may include identifying a list of unique block positions 1, 4, 5, 7, 9, and 10 of blocks included in the sequential set 202 of decremental backups. Next, a set of oldest blocks from the sequential set 202 of decremental backups for unique block positions 1, 4, 5, 7, 9, and 10 of blocks included in the sequential set 202 of decremental backups may be identified. This identification may be accomplished by examining the block positions of the blocks stored in the sequential set 202 of decremental backups. For example, the set 202 of decremental backups may be searched forward, from the oldest decremental backup d(2), for the first block for each of the unique block positions 1, 4, 5, 7, 9, and 10 in the list of unique block positions. For example, during the searching the first block having the position 1 is found in the decremental backup d(2), the first block having the position 4 is found in the decremental backup d(3), the first block having the position 5 is found in the decremental backup d(4), the first block having the position 7 is found in the decremental backup d(3), the first block having the position 9 is found in the decremental backup d(2), and the first block having the position 10 is found in the decremental backup d(3), as disclosed in FIG. 3.

The consolidation in FIG. 3 may also include pruning of free blocks out of the consolidated decremental backup. This pruning may include retrieving FSBAMs for points in time represented by the oldest decremental backup in the sequential set of decremental backups and represented by any of the other decremental backups in the decremental backup chain that depend on the oldest decremental backup in the sequential set of decremental backups, combining the FSBAMs to create a master block allocation map (MBAM), and then pruning free blocks, corresponding to block positions that are indicated as being free in the MBAM, out of the consolidated decremental backup. For example, this pruning may include retrieving the FSBAM(2) because it is the FSBAM for time t(2) which is represented by the oldest decremental backup in the set 202 of decremental backups, namely, the decremental backup d(2). Then, the FSBAM(1) may be retrieved because it is the FSBAM for time t(1) which is represented by the decremental backup in the decremental backup chain that depends on the decremental backup d(2), namely, the decremental backup d(1). Next, the FSBAM(2) and the FSBAM(1) may be combined to create a MBAM(1-2) which represents a position as being allocated, with a 1 bit, where the FSBAM(1) and/or the FSBAM(2) represent(s) the position as being allocated and represents a position as being free, with a 0 bit, only where both the FSBAM(1) and the FSBAM(2) represent the position as being free. This combination may be accomplished by performing a conceptual boolean OR operation on the FSBAM(1) and the FSBAM(2). It is understood that the boolean OR operation may be conceptual since the FSBAM (1) and the FSBAM(2) may be implemented using a data structure that does not necessarily include a bit for each block position, such as a run-length encoded list. For example, the MBAM(1-2) may be a comprehensive run-length encoded list of allocated blocks that lists all allocated blocks that are listed in either of the run-length encoded lists of the FSBAM (1) and the FSBAM(2). Finally, the unique block position that is indicated as being free in the FSBAM(2) and the FSBAM (1), namely, the unique block position 10, may be pruned out of the set of oldest blocks.

Finally, the consolidated decremental backup cd(3) may be created that includes the first blocks from block positions 1, 4, 5, 7, and 9 (and 10 if no pruning was performed) that were found during the searching of the set 202 of decremental backups. Finally, the set 202 of decremental backups may be deleted and replaced with the consolidated decremental backup cd(3), as disclosed in FIG. 3. This deletion may occur immediately after the consolidated decremental backup cd(3) has been created, or this deletion can occur later, according to a policy dictated by the user, such that the user may specify a time period or number of backups after which the set 202 of decremental backups which were the source of the consolidated decremental backup cd(3) will be deleted.

Although the consolidation of the set 202 of decremental backups eliminates the ability to restore the source storage at times t(3) and t(4), the consolidation and pruning of the set 202 of decremental backups decreases the number of backups in the decremental backup chain 200 from five to three and decreases the size of the decremental backup chain 200 from 18 blocks to 15 blocks. Therefore, once restoring the source storage 106 to times t(3) and t(4) is no longer desired, consolidation of the decremental backups d(3) and d(4) (which represent the states of the source storage 106 at times t(3) and t(4), respectively) into the decremental backup d(2) may decrease the number of decremental backups in the decremental backup chain 200, may decrease the overall size requirements of the destination storage 108 where the decremental backup chain 200 is stored, decrease the bandwidth overhead of transporting the decremental backup chain 200, and/or decrease the processing time associated with restoring one or more of the backups in the decremental backup chain 200.

Figure 4:
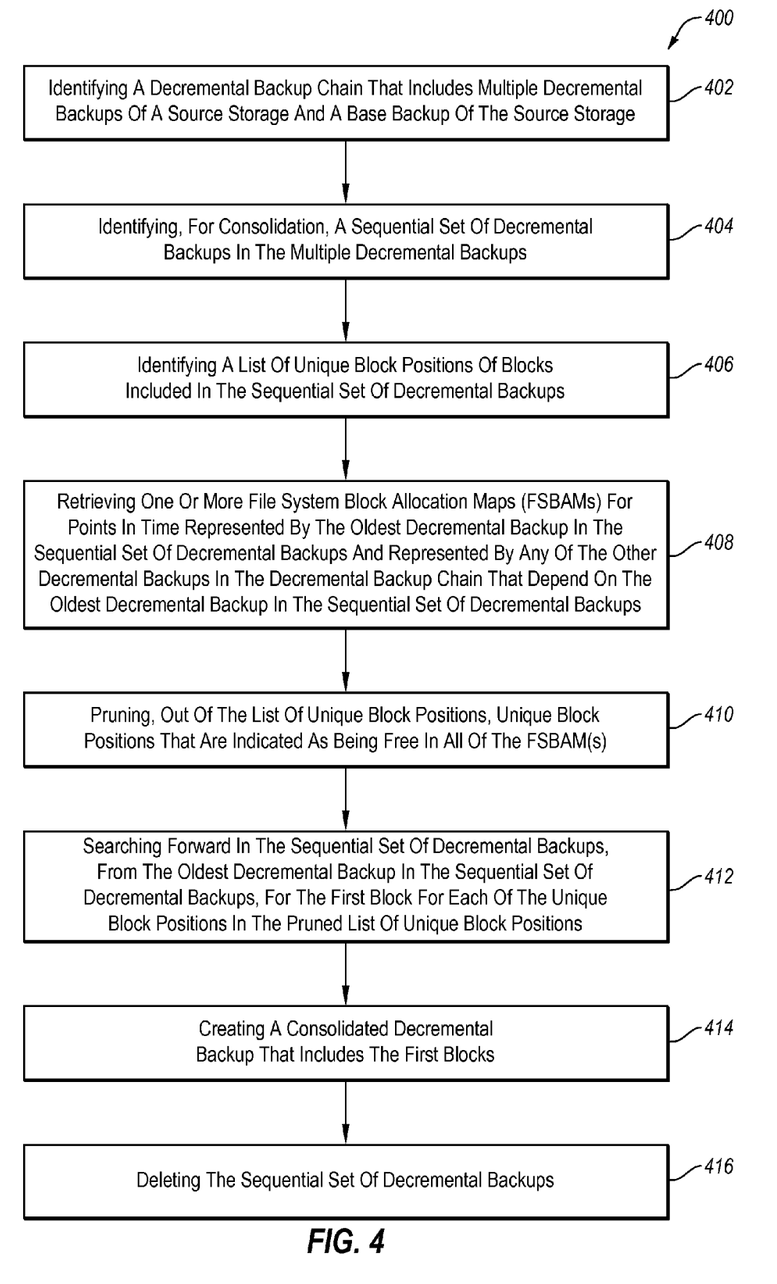
FIG. 4 is a schematic flowchart diagram of an example method for consolidating decremental backups in a decremental backup chain.

FIG. 4 is a schematic flowchart diagram of an example method 400 for consolidating decremental backups in a decremental backup chain. The method 400 may be implemented, in at least some embodiments, by the consolidation module 120 of the destination system 104 of FIG. 1. For example, the consolidation module 120 may be configured to execute computer instructions to perform operations of consolidating decremental backups in the decremental backup chain 200, as represented by one or more of steps 402-416 of the method 400. It is understood that the steps 402-416 of the method 400 may be performed in other orders than the order of the steps in the method 400. The method 400 will now be discussed with reference to FIGS. 1, 3, and 4.

The method 400 may include step 402 of identifying a decremental backup chain that includes multiple decremental backups of a source storage and a base backup of the source storage, where each of the multiple decremental backups and the base backup represents a state of the source storage at a point in time. For example, the consolidation module 120 of FIG. 1 may identify, at step 402, the decremental backup chain 200 of FIG. 3. The decremental backup chain 200 of FIG. 3 initially includes the decremental backups d(1)-d(4) and the base backup b(5).

The method 400 may include step 404 of identifying, for consolidation, a sequential set of decremental backups in the multiple decremental backups. Continuing with the above example, the consolidation module 120 of FIG. 1 may identify, at step 404, the sequential set 202 of decremental backups disclosed in FIG. 3 for consolidation.

In some embodiments, the identifying, for consolidation, of the sequential set of decremental backups at step 404 may include receiving input from a user that identifies the sequential set of decremental backups for consolidation. Additionally or alternatively, the identifying, for consolidation, of the sequential set of decremental backups at step 404 may include determining that each of the decremental backups in the sequential set of decremental backups represents a state of the source storage at a point in time that is prior to a threshold point in time set forth in a policy.

The method 400 may include step 406 of identifying a list of unique block positions of blocks included in the sequential set of decremental backups. Continuing with the above example, the consolidation module 120 of FIG. 1 may identify, at step 406, the list of unique block positions 1, 4, 5, 7, 9, and 10 disclosed in FIG. 3. This list represents the unique block positions of blocks included in the sequential set 202 of decremental backups, as disclosed in FIG. 3.

Where the method 400 includes pruning, the method 400 may include step 408 of retrieving one or more file system block allocation maps (FSBAMs) for points in time represented by the oldest decremental backup in the sequential set of decremental backups and represented by any of the other decremental backups in the decremental backup chain that depend on the oldest decremental backup in the sequential set of decremental backups. Continuing with the above example, the consolidation module 120 of FIG. 1 may retrieve, at step 406, the FSBAM(2) associated with the oldest decremental backup d(2) in the set 202 of decremental backups and the FSBAM(1) associated with the decremental backup d(1) that depends on the oldest decremental backup d(2). It is noted that where no decremental backups in the decremental backup chain depend on the oldest decremental backup in the sequential set of decremental backups, only the single FSBAM for the point in time represented by the oldest decremental backup in the sequential set of decremental backups will be retrieved at step 408.

Where the method 400 includes pruning, the method 400 may include step 410 of pruning, out of the list of unique block positions, unique block positions that are indicated as being free in all of the FSBAM(s). Continuing with the above example, the consolidation module 120 of FIG. 1 may prune, at step 410, the unique block position 10 (which is indicated as being free in both of the FSBAM(2) and the FSBAM(1)) out of the list of unique block positions, resulting in the pruned list of unique block positions, as disclosed in FIG. 3. It is noted that where only a single FSBAM is retrieved at step 408, step 410 involves pruning, out of the list of unique block positions, unique block positions that are indicated as being free in the single FSBAM.

It is noted that step 410 may be implemented by pruning free blocks out of a set of oldest blocks instead of pruning free block positions out of the list of unique block positions. Alternatively, steps 408 and 410 may be omitted altogether where pruning is not desired.

The method 400 may include step 412 of searching forward in the sequential set of decremental backups, from the oldest decremental backup in the sequential set of decremental backups, for the first block for each of the unique block positions in the list of unique block positions or pruned list of unique block positions. Continuing with the above example, the consolidation module 120 of FIG. 1 may search forward, at step 412, in the sequential set 202 of decremental backups, from the oldest decremental backup d(2) in the sequential set 202 of decremental backups, for the first block for each of the unique block positions 1, 4, 5, 7, and 9 in the pruned list of unique block positions, as disclosed in FIG. 3. For example, during the searching at step 412, the first block having the position 1 is found in the decremental backup d(2), the first block having the position 4 is found in the decremental backup d(3), the first block having the position 5 is found in the decremental backup d(4), the first block having the position 7 is found in the decremental backup d(3), and the first block having the position 9 is found in the decremental backup d(2), as disclosed in FIG. 3.

The method 400 may include step 414 of creating a consolidated decremental backup that includes the first blocks. Continuing with the above example, the consolidation module 120 of FIG. 1 may create, at step 414, the consolidated decremental backup cd(2) that includes the block from position 1 in the decremental backup d(2), the block from position 4 in the decremental backup d(3), the block from position 5 in the decremental backup d(4), the block from position 7 in the decremental backup d(3), and the block from position 9 in the decremental backup d(2), as disclosed in FIG. 3.

The method 400 may include step 416 of deleting the sequential set of decremental backups. Continuing with the above example, the consolidation module 120 of FIG. 1 may delete, at step 416, the sequential set 202 of decremental backups disclosed in FIG. 3. These deleted decremental backups may be replaced in the decremental backup chain 200 by the consolidated decremental backup cd(2), as disclosed in FIG. 3.

In some embodiments, the deleting of the sequential set of decremental backups at step 416 is performed in response to: 1) receiving input from a user that identifies the sequential set of decremental backups for deletion; 2) a predetermined period of time, as set forth in a policy, having passed since the creating of the consolidated decremental backup; 3) a predetermined period of time, as set forth in a policy, having passed since a creating of the decremental backup in the decremental backup chain representing the newest point in time; or 4) some combination thereof.

Therefore, the method 400 may be employed to consolidate the decremental backups d(3) and d(4) into the decremental backup d(2). This consolidation may decrease the number of decremental backups in the decremental backup chain 200 from five to two, decrease the overall size of the decremental backup chain 200 from 18 blocks to 15 blocks, decrease the overall size requirements of the destination storage 108 where the decremental backup chain 200 is stored, decrease the bandwidth overhead of transporting the decremental backup chain 200, and/or decrease the processing time associated with restoring one or more of the backups in the decremental backup chain 200.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for consolidating decremental backups in a decremental backup chain, the method comprising:
    identifying a decremental backup chain that includes multiple decremental backups of a source storage and a base backup of the source storage;
    identifying, for consolidation, a sequential set of decremental backups in the multiple decremental backups;
    identifying a set of oldest blocks from the sequential set of decremental backups for unique block positions of blocks included in the sequential set of decremental backups; and
    creating a consolidated decremental backup that includes the set of oldest blocks,
    wherein the identifying of the set of oldest blocks includes:
        retrieving one or more file system block allocation maps (FSBAMs) for points in time represented by the consolidated decremental backup and represented by any of the other decremental backups in the decremental backup chain that depend on the consolidated decremental backup, the retrieving of the one or more FSBAMs including, for each FSBAM, searching forward in the decremental backup chain, from the decremental backup in the decremental backup chain that represents the point in time of the FSBAM, for the first block for each of one or more block positions that make up the FSBAM in order to reconstruct the FSBAM;

identifying free blocks, corresponding to block positions that are indicated as being free in all of the FSBAM(s), in the set of oldest blocks; and pruning the free blocks out of the set of oldest blocks.

2. The method of claim 1, wherein the identifying, for consolidation, of the sequential set of decremental backups includes:

receiving input from a user that identifies the sequential set of decremental backups for consolidation.

3. The method of claim 1, wherein the identifying, for consolidation, of the sequential set of decremental backups includes:

determining that each of the decremental backups in the sequential set of decremental backups represents a state of the source storage at a point in time that is prior to a threshold point in time set forth in a policy.

4. The method of claim 1, wherein each of the one or more FSBAMs is a complete copy of the FSBAM that is associated with the decremental backup in the decremental backup chain that represents the point in time of the FSBAM.

5. The method of claim 1, further comprising:
deleting the sequential set of decremental backups.

6. The method of claim 5, wherein the deleting of the sequential set of decremental backups is performed in response to:

receiving input from a user that identifies the sequential set of decremental backups for deletion.

7. The method of claim 5, wherein the deleting of the sequential set of decremental backups is performed in response to:

a predetermined period of time, as set forth in a policy, having passed since the creating of the consolidated decremental backup; and/or a predetermined period of time, as set forth in a policy, having passed since a creating of the decremental backup in the decremental backup chain representing the newest point in time.

8. The method of claim 5, wherein the deleting of the sequential set of decremental backups is performed in response to:

a predetermined period of time, as set forth in a policy, having passed since a creating of the decremental backup in the decremental backup chain representing the newest point in time.

9. One or more non-transitory computer-readable media storing one or more programs that are configured, when executed, to cause one or more processors to perform the method as recited in claim 1.

10. A method for consolidating decremental backups in a decremental backup chain, the method comprising:

identifying a decremental backup chain that includes multiple decremental backups of a source storage and a base backup of the source storage, each of the multiple decremental backups and the base backup representing a state of the source storage at a point in time;

identifying, for consolidation, a sequential set of decremental backups in the multiple decremental backups;

identifying a list of unique block positions of blocks included in the sequential set of decremental backups;

retrieving file system block allocation maps (FSBAMs) for points in time represented by the oldest decremental backup in the sequential set of decremental backups and represented by any of the other decremental backups in the decremental backup chain that depend on the oldest decremental backup in the sequential set of decremental backups;

pruning, out of the list of unique block positions, unique block positions that are indicated as being free in all of the FSBAMs;

searching forward in the sequential set of decremental backups, from the oldest decremental backup in the sequential set of decremental backups, for the first block for each of the unique block positions in the pruned list of unique block positions;

creating a consolidated decremental backup that includes the first blocks; and deleting the sequential set of decremental backups.

11. The method of claim 10, wherein the identifying, for consolidation, of the sequential set of decremental backups includes:

receiving input from a user that identifies the sequential set of decremental backups for consolidation; and/or determining that the points in time represented by the decremental backups in the sequential set of decremental backups are prior to a threshold point in time set forth in a policy.

12. The method of claim 10, wherein the deleting of the sequential set of decremental backups is performed in response to:

a predetermined period of time, as set forth in a policy, having passed since a creating of the decremental backup in the decremental backup chain representing the newest point in time.

13. The method of claim 10, wherein the retrieving of the FSBAMs includes:

for each FSBAM, searching forward in the decremental backup chain, from the decremental backup in the decremental backup chain that represents the point in time of the FSBAM, for the first block for each of one or more block positions that make up the FSBAM in order to reconstruct the FSBAM; or for each FSBAM, retrieving a complete copy of the FSBAM that is associated with the decremental backup in the decremental backup chain that represents the point in time of the FSBAM.

14. The method of claim 10, wherein the deleting of the sequential set of decremental backups is performed in response to:

receiving input from a user that identifies the sequential set of decremental backups for deletion; and/or a predetermined period of time, as set forth in a policy, having passed since the creating of the consolidated decremental backup.

15. One or more non-transitory computer-readable media storing one or more programs that are configured, when executed, to cause one or more processors to perform the method as recited in claim 10.

* * * * *